(12) United States Patent
Nakamura (10) Patent No.: US 8,704,505 B2
(45) Date of Patent: Apr. 22, 2014

(54) SWITCHING POWER SOURCE APPARATUS

(75) Inventor: Masaru Nakamura, Niiza (JP)

(73) Assignee: Sanken Electric Co., Ltd., Niiza-shi (JP)

( * ) Notice: Subject to any disclaimer, the term of this patent is extended or adjusted under 35 U.S.C. 154(b) by 161 days.

(21) Appl. No.: 13/150,624

(22) Filed: Jun. 1, 2011

(65) Prior Publication Data

US 2011/0304309 A1   Dec. 15, 2011

(30) Foreign Application Priority Data

Jun. 11, 2010   (JP) ................................ 2010-133938

(51) Int. Cl.
*G05F 1/575*   (2006.01)
*G05F 1/618*   (2006.01)

(52) U.S. Cl.
USPC .......................................... 323/288; 323/285

(58) Field of Classification Search
USPC ............................ 323/282, 284, 285, 288, 299
See application file for complete search history.

(56) References Cited

U.S. PATENT DOCUMENTS 6,583,610 B2   6/2003   Groom et al.
8,310,219 B2 *   11/2012   Kuroyabu et al. ............ 323/271

FOREIGN PATENT DOCUMENTS

JP   2008-72891   3/2008

OTHER PUBLICATIONS

U.S. Appl. No. 13/184,663, filed Jul. 18, 2011, Nakamura.
U.S. Appl. No. 13/194,068, filed Jul. 29, 2011, Nakamura.
U.S. Appl. No. 13/209,808, filed Aug. 15, 2011, Nakamura.

* cited by examiner

*Primary Examiner* — Gary L Laxton
(74) *Attorney, Agent, or Firm* — Oblon, Spivak, McClelland, Maier & Neustadt, L.L.P.

(57) ABSTRACT

A switching power source apparatus includes a high-side MOSFET 11 connected to an input voltage Vin, a ramp signal generator 18 to generate a ramp signal in synchronization with a switching frequency of the high-side MOSFET 11, an amplitude signal generator (second feedback controller 2) to generate an amplitude signal Comp corresponding to an amplitude of the ramp signal, and a controller 1 to control ON timing of the high-side MOSFET 11 according to the ramp signal, a feedback signal FB corresponding to an output voltage Vout, and a first reference voltage REF, as well as controlling an ON width of the high-side MOSFET 11 according to the amplitude signal Comp, the input voltage Vin, and the output voltage Vout.

12 Claims, 11 Drawing Sheets

SWITCHING POWER SOURCE APPARATUS

BACKGROUND OF THE INVENTION

1. Field of the Invention

The present invention relates to a switching power source apparatus for supplying a stable DC voltage.

2. Description of Related Art

A DC-DC converter for supplying a source voltage to a digital signal processing LSI such as an image engine or a CPU is required to have an improved load response to minimize variation in an output voltage when the LSI dynamically changes its load. To meet the requirement, some DC-DC converter employs an error amplifier to compare an output voltage with a reference voltage. The error amplifier, however, causes a delay that may deteriorate the load response of the DC-DC converter. To avoid the delay by the error amplifier, a device that is widely used is a ripple converter employing no error amplifier, and instead, adopting PFM (pulse frequency modulation) control to improve load response with respect to load of the digital device.

A conventional PFM ripple converter detects a ripple voltage of an output voltage, and to obtain a sufficient ripple signal, employs as an output capacitor an electrolytic capacitor having a large ESR (equivalent series resistance). The electrolytic capacitor, however, hinders compactness of the ripple converter.

To deal with this problem, U.S. Pat. No. 6,583,610 (Patent Document 1) and Japanese Unexamined Patent Application Publication No. 2008-072891 (Patent Document 2) disclose a technique of superposing a ramp signal assuming a ripple by ESR on a feedback voltage or reference voltage, to secure stable operation even when a ceramic capacitor having a small ESR is used as an output capacitor.

Figure 1:
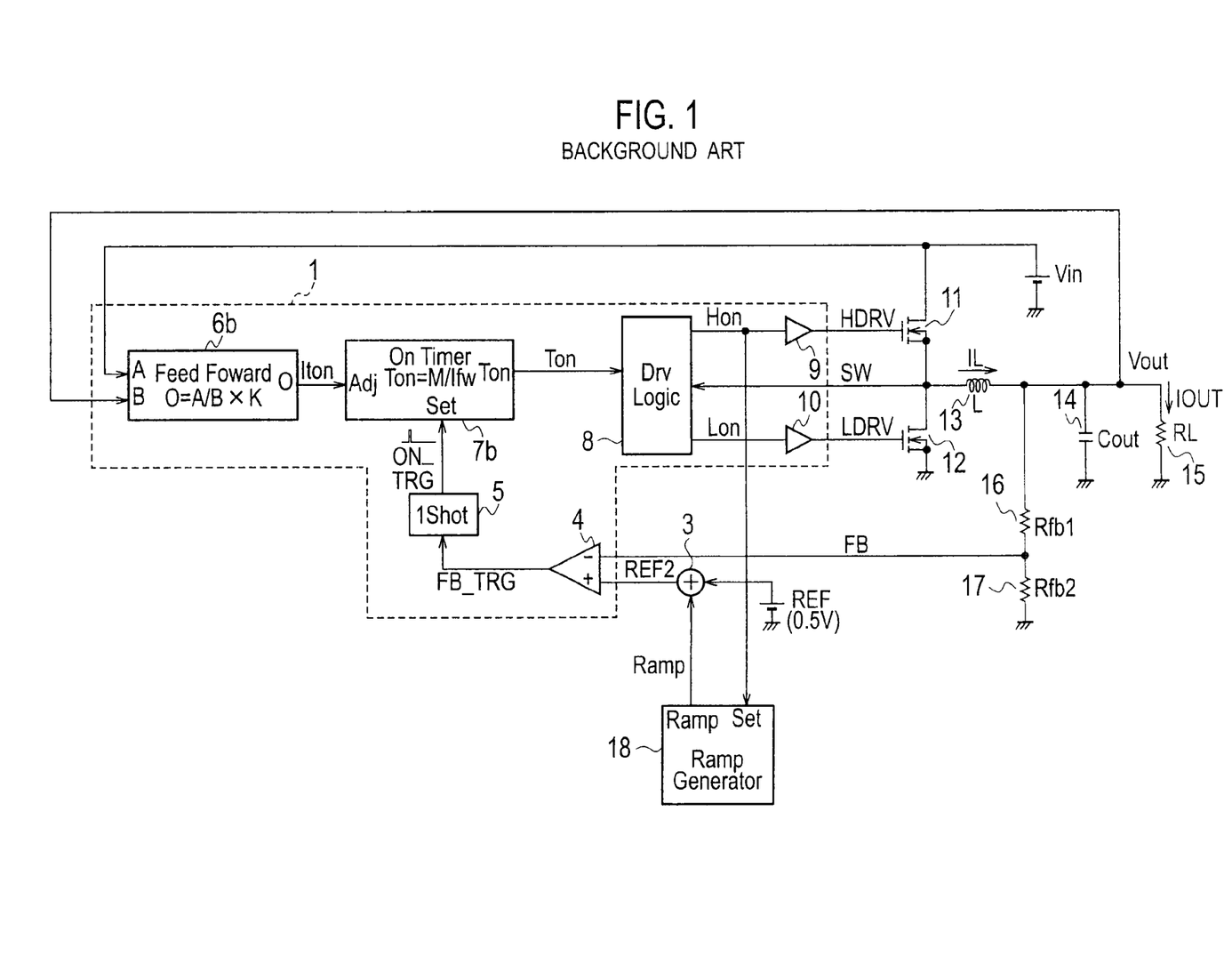
FIG. 1 is a circuit diagram illustrating a switching power source apparatus according to a related art.
Figure 2:
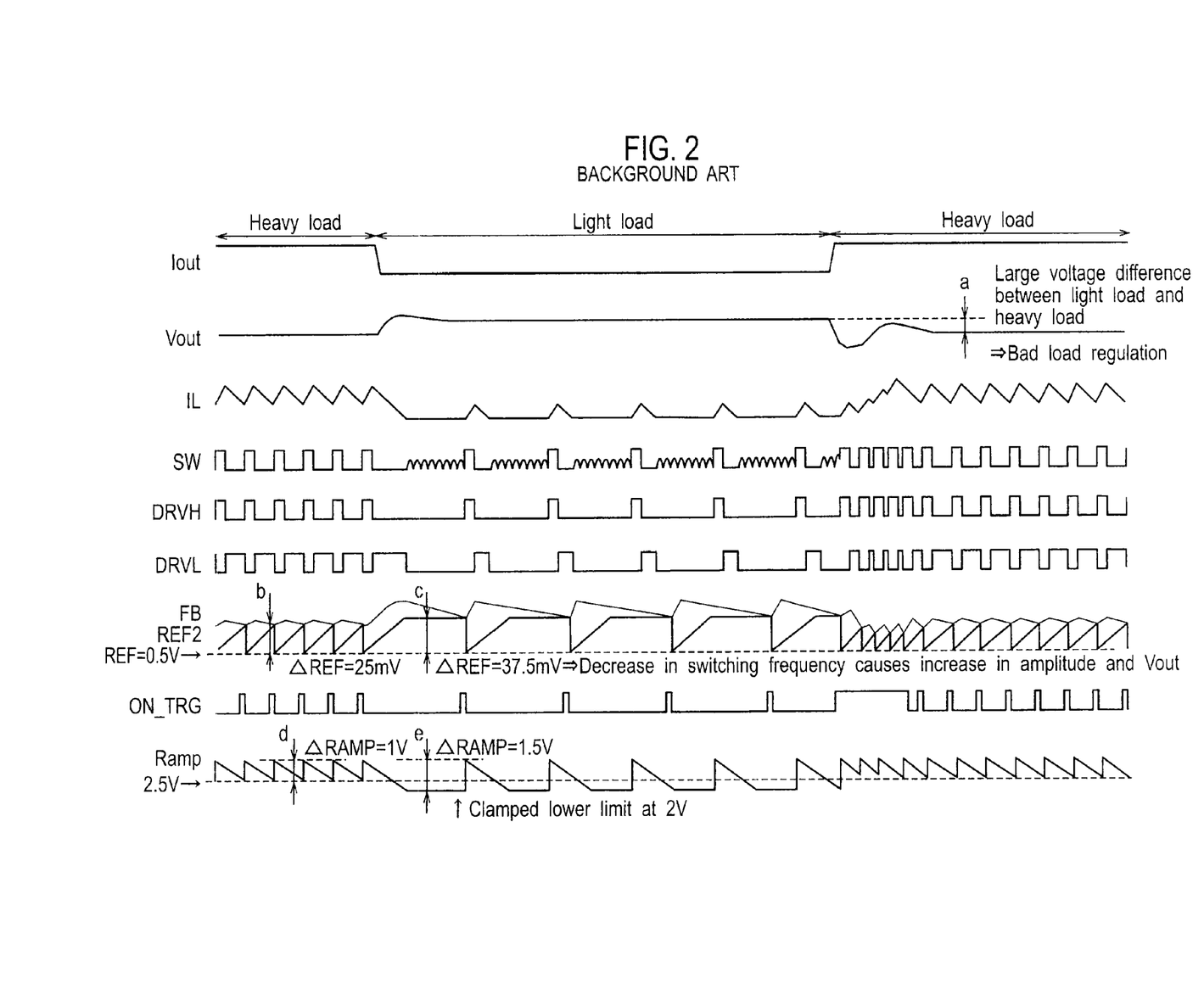
FIG. 2 is a timing chart illustrating operation of the switching power source apparatus of FIG. 1.

FIG. 1 is a circuit diagram illustrating a switching power source apparatus prepared according to the teachings of Patent Documents 1 and 2 and FIG. 2 is a timing chart illustrating operation of the apparatus of FIG. 1. With reference to FIGS. 1 and 2, operation of the switching power source apparatus employing a standard ripple control technique with fixed ON width will be explained. The technique disclosed in Patent Documents 1 and 2 superposes a ramp signal on a feedback signal. This technique is operationally equivalent to a technique of superposing a ramp signal on a reference voltage, and therefore, the apparatus and operation of FIGS. 1 and 2 will be explained in connection with the technique of superposing a ramp signal on a reference voltage because it is convenient for explaining embodiments of the present invention.

In FIG. 1, a ramp generator 18 generates a ramp signal Ramp assuming a ripple signal by ESR and outputs the ramp signal Ramp to a superposing circuit 3. The superposing circuit 3 superposes the ramp signal Ramp having a positive inclination on a first reference voltage REF, to generate a second reference voltage REF2, which is outputted to a non-inverting input terminal of a feedback comparator 4.

An inverting input terminal of the feedback comparator 4 receives a feedback voltage FB. The feedback voltage FB is produced by dividing an output voltage Vout by feedback voltage dividing resistors 16 and 17. If the feedback voltage FB is lower than the second reference voltage REF2, the feedback comparator 4 outputs a signal FB_TRG to a one-shot circuit 5.

In response to the signal FB_TRG, the one-shot circuit 5 outputs a signal ON_TRG having a predetermined time width to a terminal Set of an ON timer 7b.

A feedforward circuit 6b maintains a predetermined switching frequency even if an input voltage Vin and the output voltage Vout change. For this, the feedforward circuit 6b detects the input voltage Vin and output voltage Vout, generates a feedforward signal Iton that is proportional to the input voltage Vin and inversely proportional to the output voltage Vout, and outputs the same to a terminal Adj of the ON timer 7b.

The ON timer 7b receives the signal ON_TRG as a trigger from the one-shot circuit 5 and outputs a signal Ton corresponding to the feedforward signal Iton to a drive logic 8. The larger the feedforward signal Iton, the narrower the time width of the signal Ton.

Based on the signal Ton from the ON timer 7b, the drive logic 8 outputs a drive signal Hon for a high-side driver 9 and a drive signal Lon for a low-side driver 10. The drive logic 8 detects, from a signal SW, that a regenerative period ends and the polarity of a current IL passing through an inductor 13 inverts, and then, changes the drive signal Lon from high to low to turn off a low-side MOSFET 12, thereby preventing the inductor current IL from excessively passing in a reverse direction and avoiding a useless loss.

In response to the signal Hon from the drive logic 8, the high-side driver 9 drives a gate of a high-side MOSFET 11, to supply energy through the inductor 13 to an output capacitor 14 and output load 15.

In response to the signal Lon from the drive logic 8, the low-side driver 10 drives a gate of the low-side MOSFET 12, to turn on the low-side MOSFET 12 in a regenerative period of the inductor current IL after the high-side MOSFET 11 is turned off, thereby reducing a conduction loss.

In this way, the switching power source apparatus of FIG. 1 turns on the high-side MOSFET 11 as soon as the output voltage Vout decreases due to a sudden change in an output load current Iout from light load to heavy load, thereby improving a load response. In addition, the apparatus of FIG. 1 enables a ceramic capacitor to be used as an output capacitor, which the related arts are unachievable.

SUMMARY OF THE INVENTION

The technique of superposing a ramp signal having a given inclination on the feedback voltage FB or reference voltage REF according to Patent Documents 1 and 2, however, has a problem. A change in the output load current Iout results in changing the switching frequency of the high-side MOSFET 11 and the amplitude of the ramp signal Ramp. This results in changing the output voltage Vout, to deteriorate a load regulation that is an important characteristic of the DC-DC converter. This will be explained in detail with reference to the timing chart of FIG. 2.

When the output load current Iout suddenly changes from a heavy load condition to a light load condition, the output voltage Vout momentarily jumps, and thereafter, decreases as time passes. When the feedback signal FB decreases below a peak of the second reference voltage REF2 on which the ramp signal Ramp is superposed, the one-shot circuit 5 outputs the ON trigger signal ON_TRG to turn on the high-side MOSFET 11. However, the smaller the output load current Iout, the longer the ON timing of the high-side MOSFET 11 delays. Namely, the lower the output load current Iout, the lower the switching frequency of the high-side MOSFET 11.

When the switching frequency decreases, the amplitude of the ramp signal Ramp superposed on the first reference voltage REF increases, and therefore, the second reference voltage REF2 becomes larger than that under heavy load. This results in deteriorating the load regulation characteristic of the switching power source apparatus. As illustrated in FIG. 2, the output voltage Vout sharply drops when the light load changes to heavy load and does not recover thereafter. This means that there is a large voltage difference between light load and heavy load, to deteriorate the load regulation characteristic.

To improve the load regulation characteristic, the amplitude of the ramp signal Ramp superposed on the second reference voltage REF2 must be decreased. This, however, destabilizes operation because a capacitor such as a ceramic capacitor having a small ESR is used as an output capacitor for compactness of the switching power source apparatus.

To solve the problems of the related arts, the present invention provides a switching power source apparatus capable of conducting stable operation and realizing a good load regulation characteristic even with an output capacitor having a small ESR.

According to an aspect of the present invention, the switching power source apparatus includes a main switching element connected to an input voltage, a ramp signal generator configured to generate a ramp signal in synchronization with a switching frequency of the main switching element, an amplitude signal generator configured to generate an amplitude signal corresponding to an amplitude of the ramp signal, and a controller configured to control ON timing of the main switching element according to the ramp signal, a feedback signal corresponding to an output voltage, and a first reference voltage, as well as controlling an ON width of the main switching element according to the amplitude signal, the input voltage, and the output voltage.

DESCRIPTION OF PREFERRED EMBODIMENTS

Switching power source apparatuses according to embodiments of the present invention will be explained in detail with reference to the drawings.

Embodiment 1

A switching power source apparatus according to Embodiment 1 of the present invention will be explained with reference to FIGS. 3 to 12. Parts of the switching power source apparatus of Embodiment 1 that are similar to those of the switching power source apparatus of the related art illustrated in FIG. 1 are represented with like reference numerals to avoid a repetition of explanation.

Figure 3:
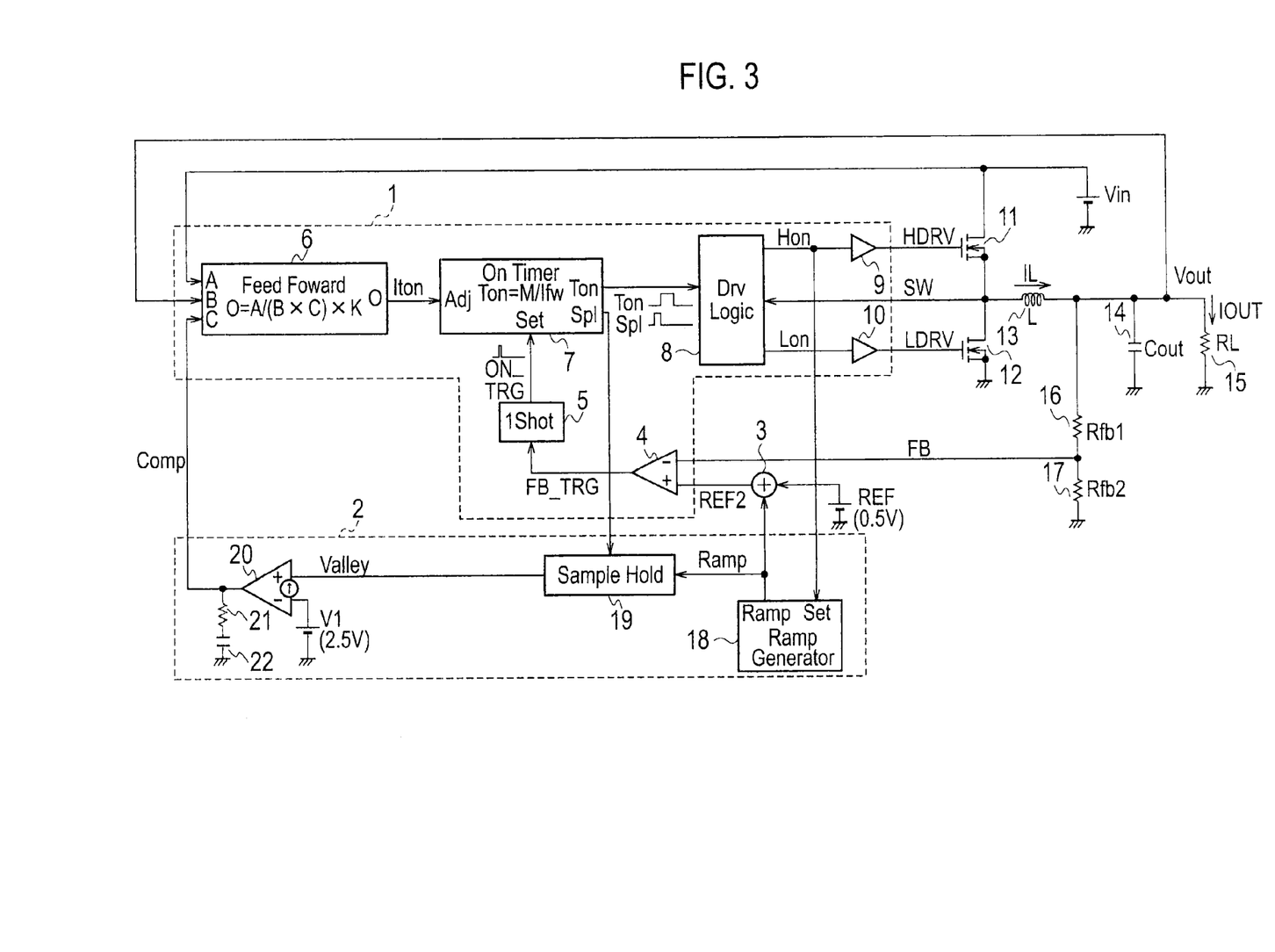
FIG. 3 is a circuit diagram illustrating a switching power source apparatus according to Embodiment 1 of the present invention.

In FIG. 3, the switching power source apparatus according to Embodiment 1 includes a first feedback controller 1, a second feedback controller 2, a superposing circuit 3, a high-side MOSFET 11, a low-side MOSFET 12, an inductor 13, an output smoothing capacitor 14, an output load 15, and feedback resistors 16 and 17.

The first feedback controller 1 includes a feedback comparator 4, a one-shot circuit 5, a feedforward circuit 6, an ON timer 7, a drive logic 8, a high-side driver 9, and a low-side driver 10.

The second feedback controller 2 includes a ramp generator 18, a sample and hold circuit 19, an error amplifier 20, a phase compensation resistor 21, and a phase compensation capacitor 22.

The switching power source apparatus of Embodiment 1 differs from the switching power source apparatus of the related art illustrated in FIG. 1 in that the apparatus of Embodiment 1 additionally has the second feedback controller 2.

The high-side MOSFET 11 corresponds to the main switching element stipulated in the claims. The high-side MOSFET 11 has a source that is connected to a drain of the low-side MOSFET 12 and through the inductor 13 to the output load 15. The switching power source apparatus according to the present embodiment carries out switching operation of the high- and low-side MOSFETs 11 and 12, to convert an input voltage Vin into a predetermined output voltage Vout supplied to the output load 15.

The first feedback controller 1 acts as a major loop to handle the output load 15 that dynamically changes. If the output load 15 suddenly changes from light to heavy, the first feedback controller 1 quickly operates without using the error amplifier 20, to minimize a change in the output voltage Vout.

On the other hand, the second feedback controller 2 acts as a minor loop to detect an amplitude of a ramp signal Ramp generated by the ramp generator 18 and optimize an ON width of the high-side MOSFET 11 in such a way as to maintain the amplitude of the ramp signal Ramp at a constant value without regard to an output load current Tout. This results in keeping a switching frequency Fsw of the main switching element at a constant value. With this control, the peak of a second reference voltage REF2 is always kept constant with respect to a static load variation, thereby remarkably improving the load regulation characteristic of the switching power source apparatus without sacrificing control stability.

Figure 4:
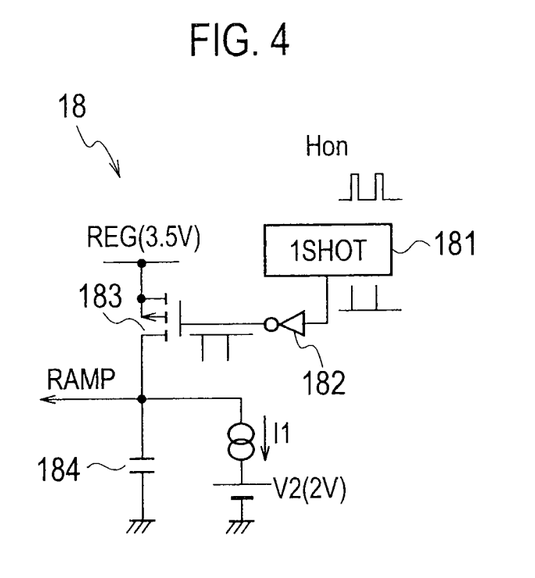
FIG. 4 is a circuit diagram illustrating a ramp generator arranged in the apparatus of FIG. 3.

The ramp generator 18 corresponds to the ramp signal generator stipulated in the claims and generates a ramp signal in synchronization with the switching frequency of the main switching element. FIG. 4 is a circuit diagram illustrating the details of the ramp generator 18. In FIG. 4, the ramp generator 18 includes a one-shot circuit 181, an inverter 182, a p-channel MOSFET 183, a capacitor 184, a constant current source I1, and a lower limit clamp voltage V2.

The one-shot circuit 181 receives a drive signal Hon from the high-side driver 9, and when the drive signal Hon changes to high, turns on the p-channel MOSFET 183 for a very short period such as about 100 ns, thereby charging the capacitor 184 to a power source voltage REG at once.

When the p-channel MOSFET 183 is turned off, the capacitor 184 is gradually discharged by the constant current source I1. As a result, the ramp generator 18 generates a ramp signal Ramp assuming a ripple signal by ESR and outputs the ramp signal Ramp to the superposing circuit 3 and the sample and hold circuit 19.

The superposing circuit 3 corresponds to the first superposing circuit stipulated in the claims. The superposing circuit 3 generates a second ramp signal having a positive inclination and corresponding to the amplitude and frequency of the ramp signal Ramp generated by the ramp generator 18 and superposes the second ramp signal on a first reference voltage REF (0.5 V), to generate a first superposed signal REF2.

Figure 5:
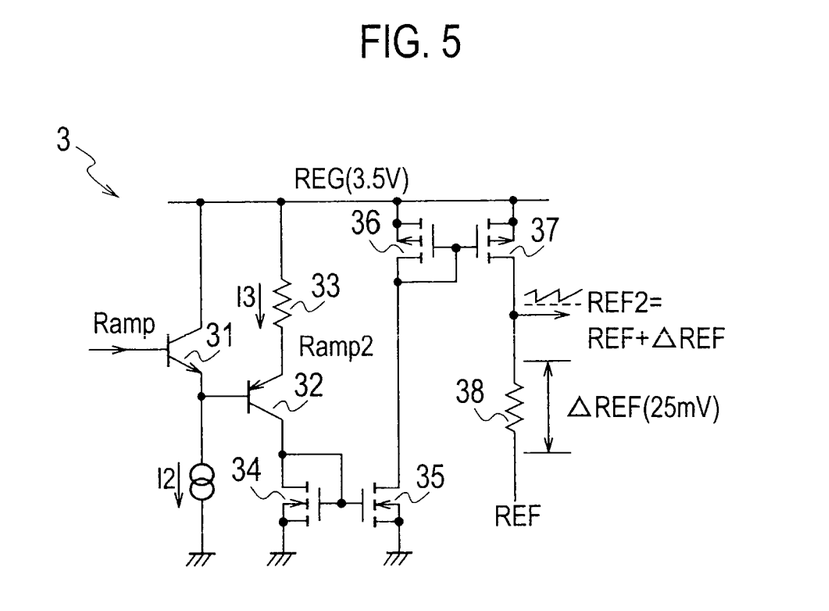
FIG. 5 is a circuit diagram illustrating a superposing circuit arranged in the apparatus of FIG. 3.

FIG. 5 is a circuit diagram illustrating the details of the superposing circuit 3. In FIG. 5, the superposing circuit 3 includes an npn transistor 31, a pnp transistor 32, a resistor 33, n-channel MOSFETs 34 and 35, p-channel MOSFETs 36 and 37, a resistor 38, and a constant current source 12.

The ramp signal Ramp generated by the ramp generator 18 is received by a buffer circuit of the npn transistor 31 and pnp transistor 32. The buffer circuit conducts impedance conversion on the ramp signal Ramp, so that an emitter of the pnp transistor 32 outputs a signal Ramp2 whose voltage level is substantially equal to that of the ramp signal Ramp. As a result, both ends of the resistor 33 cause a potential difference of (REG−Ramp2) to generate a current signal 13 corresponding to a change in the ramp signal Ramp. The current signal 13 passes through the resistor 38 by way of a current mirror circuit of the n-channel MOSFETs 34 and 35 and a current mirror circuit of the p-channel MOSFETs 36 and 37 and is converted into a voltage by the resistor 38.

In this way, at a high-potential terminal of the resistor 38, the superposing circuit 3 superposes the second ramp signal having a positive inclination corresponding to the ramp signal Ramp on the first reference voltage REF that is a stable DC voltage, to generate the second reference voltage REF2 (corresponding to the first superposed signal stipulated in the claims), which is outputted to a non-inverting input terminal of the feedback comparator 4.

The sample and hold circuit 19, error amplifier 20, phase compensation resistor 21, and phase compensation capacitor 22 arranged in the second feedback controller 2 correspond to the amplitude signal generator stipulated in the claims and generate an amplitude signal Comp corresponding to the amplitude of the ramp signal Ramp generated by the ramp generator 18.

Figure 6:
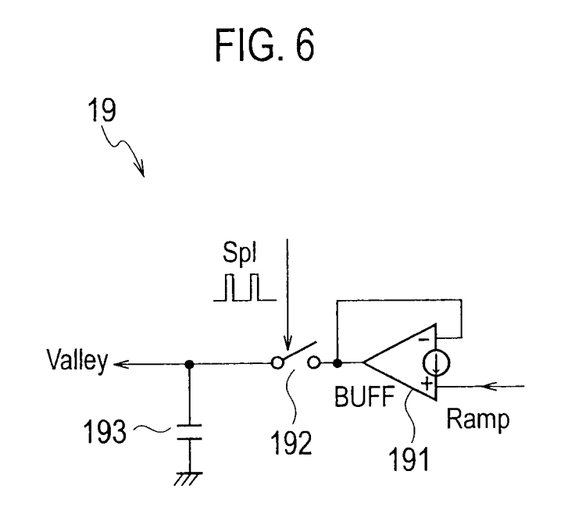
FIG. 6 is a circuit diagram illustrating a sample and hold circuit arranged in the apparatus of FIG. 3.

The sample and hold circuit 19 holds a valley voltage of the ramp signal Ramp generated by the ramp generator 18. FIG. 6 is a circuit diagram illustrating the details of the sample and hold circuit 19. In FIG. 6, the sample and hold circuit 19 includes a buffer circuit 191, a switch 192, and a capacitor 193.

The buffer circuit 191 outputs an impedance-converted signal of the ramp signal Ramp. When the ramp signal Ramp reaches a valley voltage Valley, the switch 192 turns on for a predetermined sampling period in response to a sampling signal Spl from the ON timer 7, to charge the capacitor 193.

Accordingly, the capacitor 193 holds the valley voltage Valley of the ramp signal Ramp until the next sampling period.

The error amplifier 20 compares the valley voltage Valley held by the sample and hold circuit 19 with a reference voltage V1, generates an error amplified signal according to a result of the comparison, and outputs the error amplified signal as the amplitude signal Comp. Namely, the error amplifier 20 compares the valley voltage Valley with the reference voltage V1 and outputs the amplitude signal Comp, which is phase-compensated by the resistor 21 and capacitor 22 and is sent to the feedforward circuit 6.

The first feedback controller 1 corresponds to the controller stipulated in the claims. According to the ramp signal Ramp generated by the ramp generator 18, the feedback signal FB corresponding to the output voltage Vout, and the first reference voltage REF, the first feedback controller 1 controls ON timing of the main switching element, i.e., the high-side MOSFET 11. At the same time, the first feedback controller 1 controls an ON width of the main switching element according to the amplitude signal Comp generated by the amplitude signal generator, the input voltage Vin, and the output voltage Vout.

Figure 7:
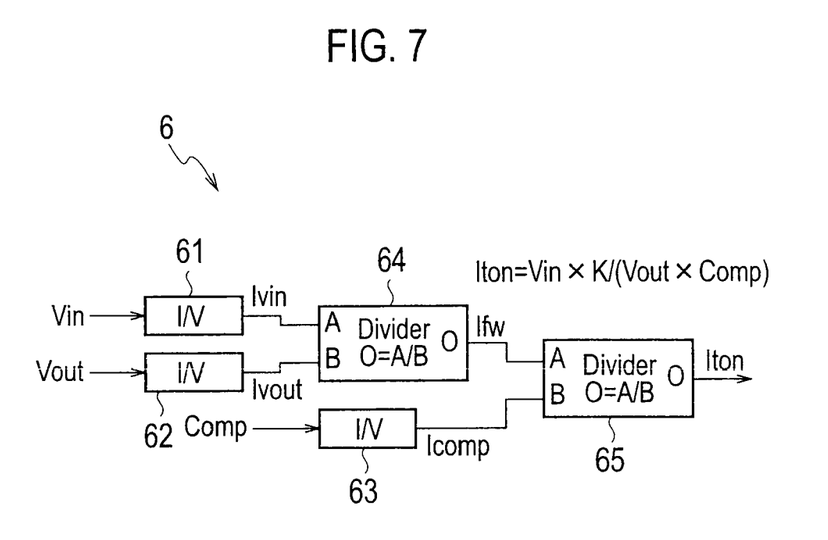
FIG. 7 is a circuit diagram illustrating a feedforward circuit arranged in the apparatus of FIG. 3.

FIG. 7 is a circuit diagram illustrating the details of the feedforward circuit 6. In FIG. 7, the feedforward circuit 6 includes voltage-current converters 61, 62, and 63 and dividers 64 and 65.

The voltage-current converter 61 converts the input voltage Vin into a current signal Ivin. The voltage-current converter 62 converts the output voltage Vout into a current signal Ivout. The voltage current converter 63 converts the amplitude signal (error amplified voltage) Comp into a current signal Icomp.

The divider 64 divides the current Ivin by the current Ivout and outputs a current signal Ifw to the divider 65. The divider 65 divides the current signal Ifw by the current signal Icomp and outputs a current signal Iton obtained by a relationship of Iton=K×Vin/(Vout×Comp), where K is a conversion coefficient for converting the input voltage Vin, output voltage Vout, and amplitude signal Comp into the respective current signals. The conversion coefficient K has a resistance dimension.

The feedforward circuit 6 outputs the output current Iton to the terminal Adj of the ON timer 7, the output current Iton being proportional to the input voltage Vin and inversely proportional to the output voltage Vout. With this operation of the feedforward circuit 6, the first feedback controller 1 controls the ON width of the high-side MOSFET 11 in such a way as to maintain the switching frequency of the high-side MOSFET 11 without regard to input and output conditions. The output current Iton is inversely proportional to the amplitude signal (error amplified signal) Comp from the second feedback controller 2, and therefore, the first feedback controller 1 also controls the ON width of the high-side MOSFET 11 in such a way as to equalize the valley voltage Valley of the ramp signal Ramp with the reference voltage V1.

The first feedback controller 1 with the feedforward circuit 6 uses the amplitude signal (error amplified signal) Comp from the amplitude signal generator, to control the ON width of the high-side MOSFET 11, i.e., the main switching element so that the amplitude of the ramp signal Ramp generated by the ramp generator 18 keeps a predetermined value.

The feedback comparator 4 compares the feedback voltage FB with the second reference voltage REF2, and if the feedback voltage FB is lower than a peak of the second reference voltage REF2, outputs a signal FB_TRG to the one-shot circuit 5. Based on the signal FB_TRG, the one-shot circuit 5 outputs a signal ON_TRG to a terminal Set of the ON timer 7.

Figure 8:
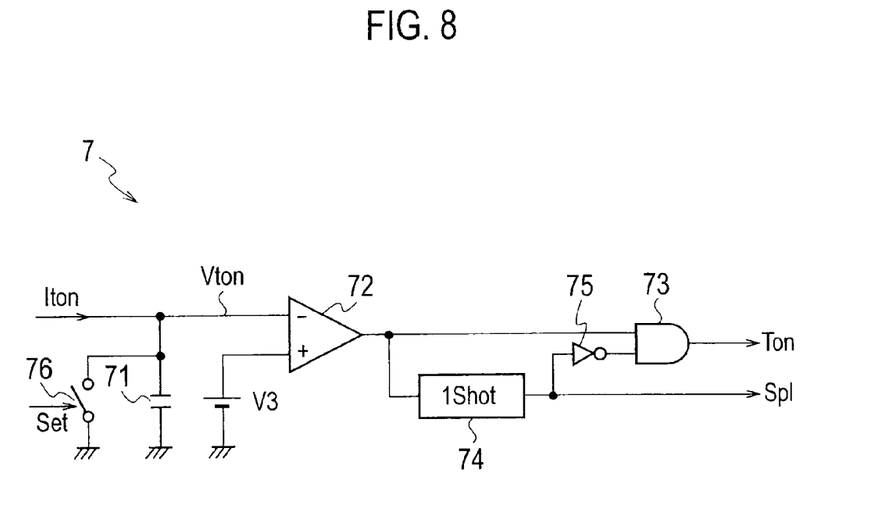
FIG. 8 is a circuit diagram illustrating an ON timer arranged in the apparatus of FIG. 3.

FIG. 8 is a circuit diagram illustrating the details of the ON timer 7. In FIG. 8, the ON timer 7 includes a capacitor 71, a comparator 72, an AND gate 73, a one-shot circuit 74, an inverter 75, and a switch 76.

Based on the signal ON_TRG from the one-shot circuit 5, the switch 76 turns on for a predetermined period to discharge the capacitor 71 at once. This makes the comparator 72 provide a logical output of high, and therefore, the one-shot circuit 74 outputs a sampling signal Spl having a predetermined period.

When the sampling period set by the one-shot circuit 74 ends, the AND gate 73 makes an output signal, i.e., the drive logic control signal Ton high. Thereafter, the capacitor 71 is charged according to the feedforward current signal Iton. When the capacitor 71 reaches a threshold voltage V3, the comparator 72 provides a low-level output so that the AND gate 73 changes the drive logic control signal Ton to low.

Based on the drive logic control signal Ton from the ON timer 7, the drive logic 8 outputs the drive signal Hon for the high-side driver 9 and the drive signal Lon for the low-side driver 10, the drive signals Hon and Lon being in reverse phase. According to the voltage SW, the drive logic 8 detects that a regenerative period of the inductor 13 ends and the polarity of the current IL passing through the inductor 13 inverts, and then, changes the low-side drive signal Lon from high to low to turn off the low-side MOSFET 12. This prevents an excessive reverse flow of the inductor current IL and a useless loss.

According to the signal Hon from the drive logic 8, the high-side driver 9 drives the gate of the high-side MOSFET 11 to supply energy through the inductor 13 to the output capacitor 14 and output load 15.

According to the signal Lon from the drive logic 8, the low-side driver 10 drives the gate of the low-side MOSFET 12, to turn on the low-side MOSFET 12 in a regenerative period of the inductor current IL after the high-side MOSFET 11 is turned off, thereby reducing a conduction loss.

As is apparent from the above-mentioned operation of the feedback comparator 4, one-shot circuit 5, ON timer 7, drive logic 8, and high-side driver 9, the first feedback controller 1 compares the first superposed signal REF2 from the superposing circuit 3 with the feedback signal FB, and if the feedback signal FB is lower than the first superposed signal REF2, turns on the high-side MOSFET 11, i.e., the main switching element.

Action of the switching power source apparatus according to the present embodiment will be explained. In particular, mechanisms of maintaining the amplitude of the ramp signal Ramp and improving the load regulation characteristic will be explained with reference to the timing chart of FIG. 9.

Figure 9:
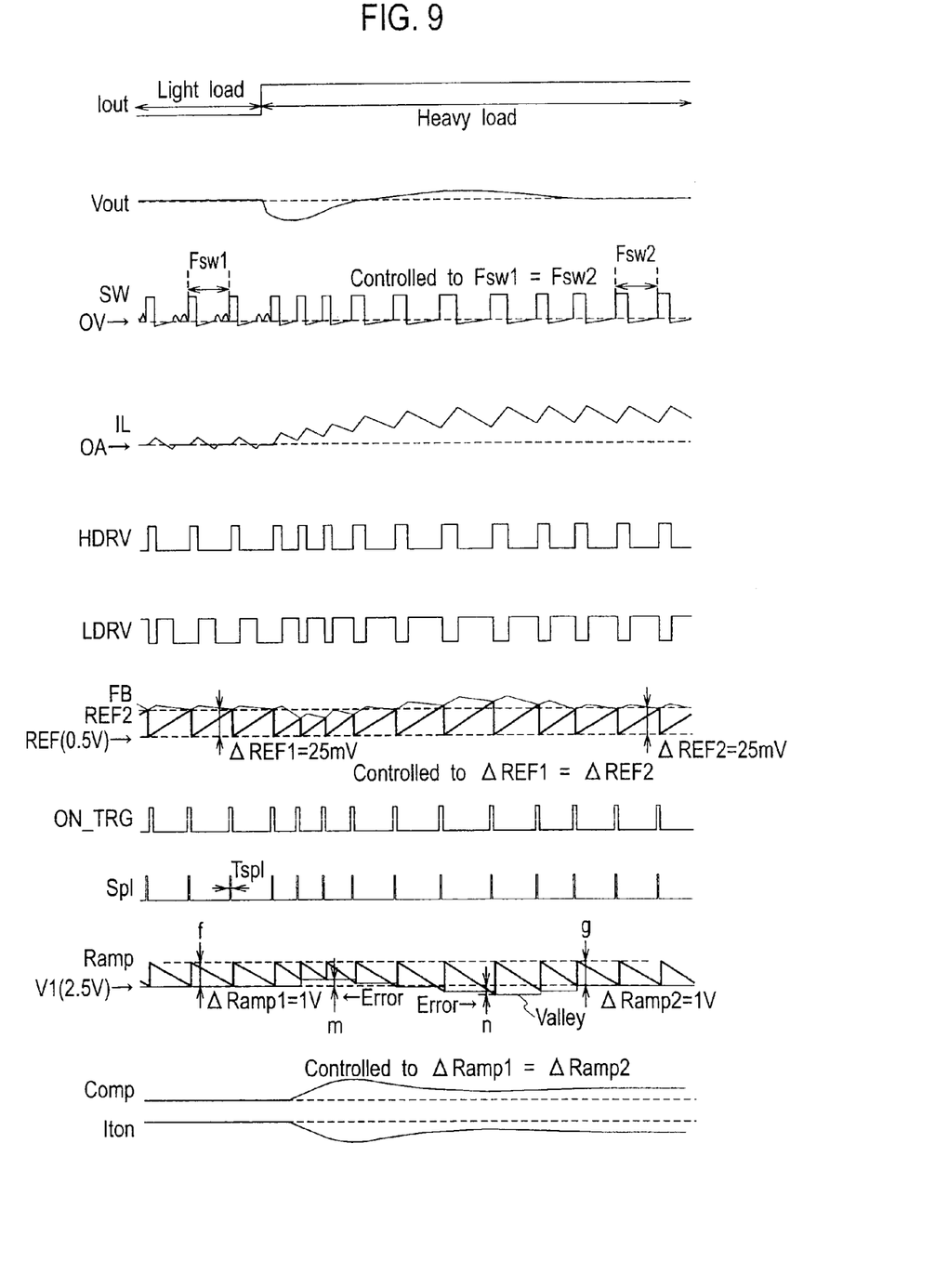
FIG. 9 is a timing chart illustrating operation of the apparatus of FIG. 3.

When the output load current Iout is in a steady light load state, the sample and hold circuit 19, error amplifier 20, and feedforward circuit 6 operate to equalize the valley voltage Valley of the ramp signal Ramp with the reference voltage V1.

When the output load current Iout suddenly changes to a heavy load state, the output voltage Vout decreases to decrease the feedback voltage FB. When the feedback voltage FB becomes equal to or lower than the second reference voltage REF2, the one-shot circuit 5 outputs the signal ON_TRG according to a comparison result from the feedback comparator 4. In response to the signal ON_TRG, the high-side MOSFET 11 is turned on at once. At this time, the valley voltage Valley of the ramp signal Ramp increases to produce an error with respect to the reference voltage V1.

To cancel the error, the error amplifier 20 in the second feedback controller 2 increases the amplitude signal Comp. In reverse proportion to the increase of the amplitude signal Comp, the feedforward current Iton from the feedforward circuit 6 decreases. Due to the decrease of the feedforward signal Iton, the ON timer 7 widens the time width of the signal Ton.

As a result, the first feedback controller 1 widens the ON width of the high-side MOSFET 11. Namely, based on the amplitude signal Comp from the amplitude signal generator, the first feedback controller 1 widens the ON width of the main switching element, i.e., the high-side MOSFET 11 when the amplitude of the ramp signal Ramp generated by the ramp generator 18 is lower than the predetermined value.

When the ON width of the high-side MOSFET 11 is widened, the switching frequency thereof decreases to maintain an ON duty that is substantially determined by a ratio of the input voltage Vin to the output voltage Vout. Consequently, a switching frequency Fsw1 under light load and a switching frequency Fsw2 under heavy load are equalized to each other. This results in equalizing the valley voltage Valley of the ramp signal Ramp with the reference voltage V1, and therefore, an amplitude of AREF superposed on the second reference voltage REF2 is controlled to be constant ($\Delta$REF1=$\Delta$REF2 in FIG. 9) without regard to the load current Tout.

When the feedback voltage FB increases and the valley voltage Valley of the ramp signal Ramp decreases to create an error between the valley voltage Valley and the reference voltage V1, the error amplifier 20 in the second feedback controller 2 decreases the amplitude signal Comp to cancel the error. As a result, the first feedback controller 1 narrows the ON width of the high-side MOSFET 11. Namely, according to the amplitude signal Comp from the amplitude signal generator, the first feedback controller 1 narrows the ON width of the main switching element, i.e., the high-side MOSFET 11 when the amplitude of the ramp signal Ramp from the ramp generator 18 is equal to or higher than the predetermined value.

When the ON width of the high-side MOSFET 11 is narrowed, the switching frequency thereof increases to equalize the switching frequency Fsw1 under light load with the switching frequency Fsw2 under heavy load. This results in equalizing the valley voltage Valley of the ramp signal Ramp with the reference voltage V1, and therefore the amplitude of $\Delta$REF superposed on the second reference voltage REF2 is controlled to be constant ($\Delta$REF1=$\Delta$REF2 in FIG. 9) without regard to the load current Tout.

In this way, for a dynamic load variation, the first feedback controller 1, i.e., the major loop quickly responds without using the error amplifier 20, to minimize a change in the output voltage Vout. On the other hand, for a static load variation, the error amplifier 20 is used to keep the amplitude of the ramp signal Ramp at a constant value. As a result, the switching power source apparatus according to the present embodiment greatly improves the load regulation characteristic thereof without sacrificing control stability.

As mentioned above, the switching power source apparatus according to the present embodiment realizes stable control and a proper load regulation characteristic even with the use of a capacitor having a small ESR as an output capacitor.

Figure 10:
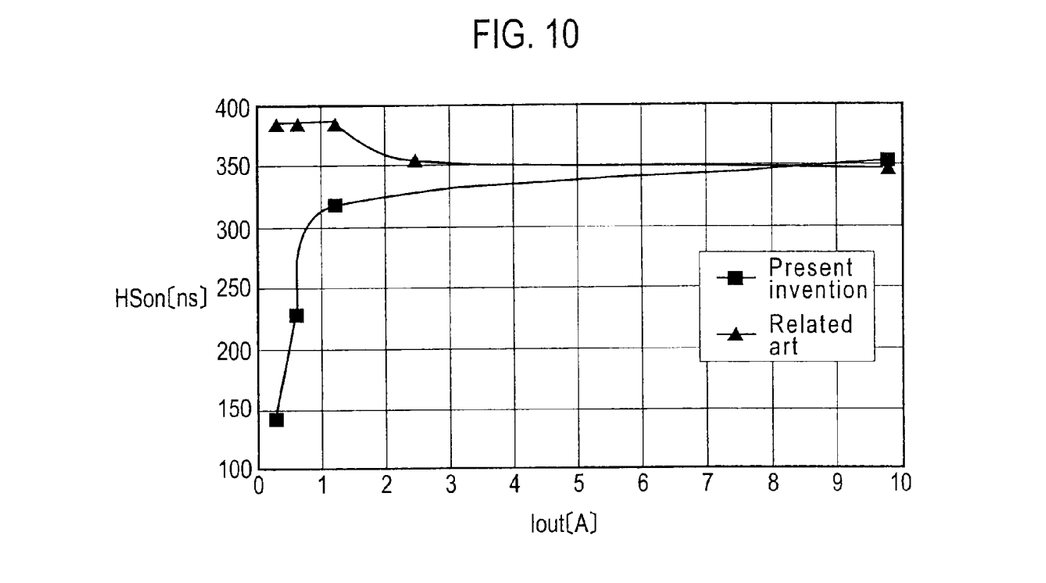
FIG. 10 is a graph illustrating a relationship between output current and ON width of a high-side MOSFET of the switching power source apparatus according to Embodiment 1 and that according to a related art.
Figure 11:
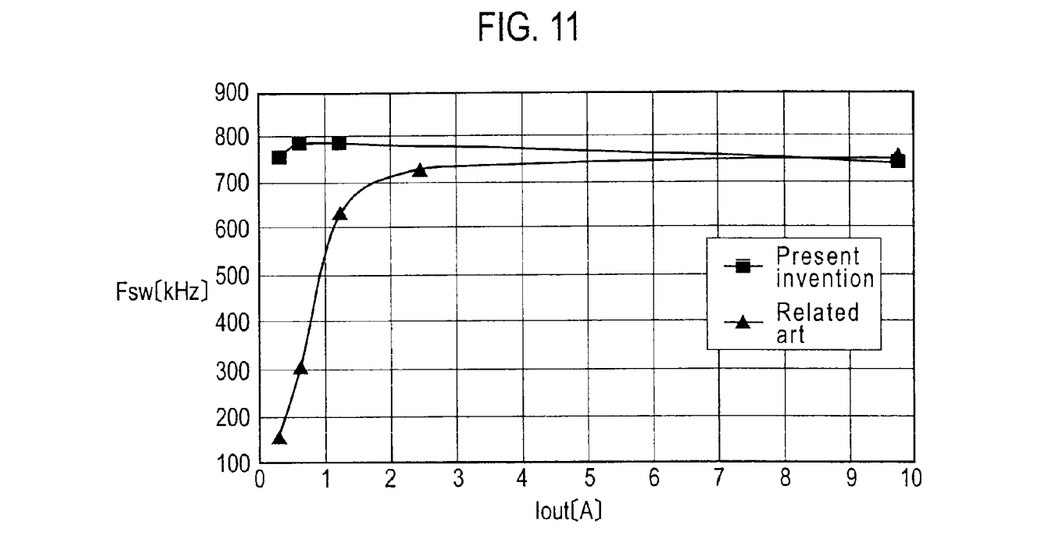
FIG. 11 is a graph illustrating a relationship between output current and switching frequency of the switching power source apparatus according to Embodiment 1 and that according to a related art.
Figure 12:
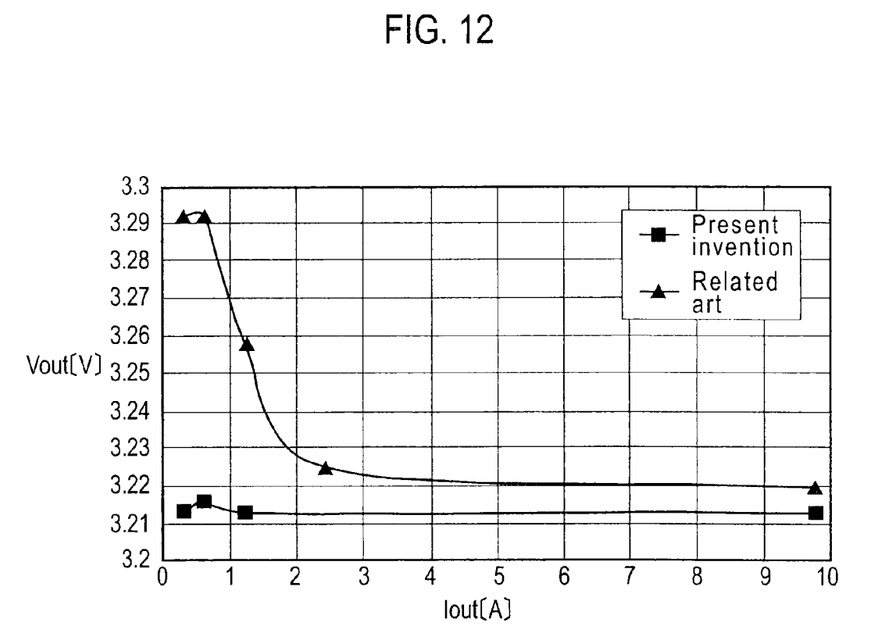
FIG. 12 is a graph illustrating a relationship (load regulation characteristic) between output current and output voltage of the switching power source apparatus according to Embodiment 1 and that according to a related art.

FIGS. 10, 11, and 12 are graphs illustrating various characteristics obtained through circuit simulations. Among them, the graph of FIG. 10 illustrates a relationship between output current Iout and high-side MOSFET ON width HSon according to the present embodiment and that according to a related art. The related art substantially maintains the high-side MOSFET ON width without regard to the load current. On the other hand, the present embodiment narrows the high-side MOSFET ON width as the load current decreases.

FIG. 11 illustrates a relationship between output current Iout and switching frequency Fsw according to the present embodiment and that according to a related art. The present embodiment substantially maintains the switching frequency Fsw without regard to the load current Iout.

Namely, as explained in connection with FIG. 10, the present embodiment narrows the high-side MOSFET ON width as the load current decreases, and therefore, the switching frequency Fsw is substantially not dependent on the load current Iout. As a result, the amplitude of ΔREF superposed on the second reference voltage REF2 according to the present embodiment is controlled to be constant without regard to the load current Iout, to thereby remarkably improve the load regulation characteristic.

FIG. 12 illustrates a relationship between output current Iout and output voltage Vout according to Embodiment 1 and that according to a related art. Embodiment 1 controls the output voltage Vout to be substantially constant without regard to the load current Iout, to thereby greatly improve the load regulation characteristic compared with the related art.

Embodiment 2

Figure 13:
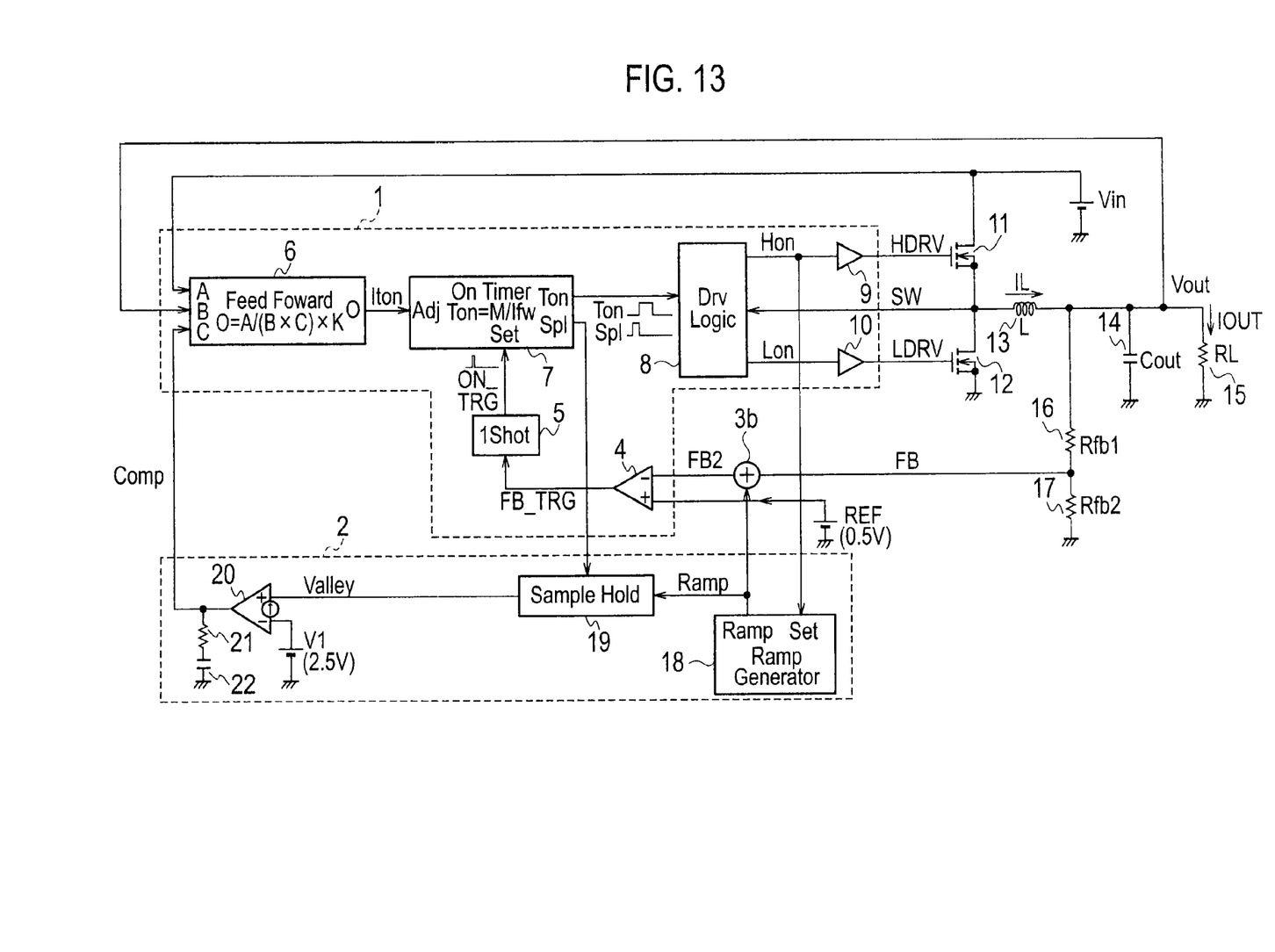
FIG. 13 is a circuit diagram illustrating a switching power source apparatus according to Embodiment 2 of the present invention.

FIG. 13 is a circuit diagram illustrating a switching power source apparatus according to Embodiment 2 of the present invention. Embodiment 2 differs from Embodiment 1 of FIG. 3 in that Embodiment 2 employs a superposing circuit 3b whose configuration and connected location are different from those of the superposing circuit 3 of Embodiment 1.

The superposing circuit 3b corresponds to the second superposing circuit stipulated in the claims. The superposing circuit 3b generates a third ramp signal having a negative inclination corresponding to the amplitude and frequency of a ramp signal Ramp generated by a ramp generator 18 and superposes the third ramp signal on a feedback signal FB to generate a second superposed signal FB2.

Figure 14:
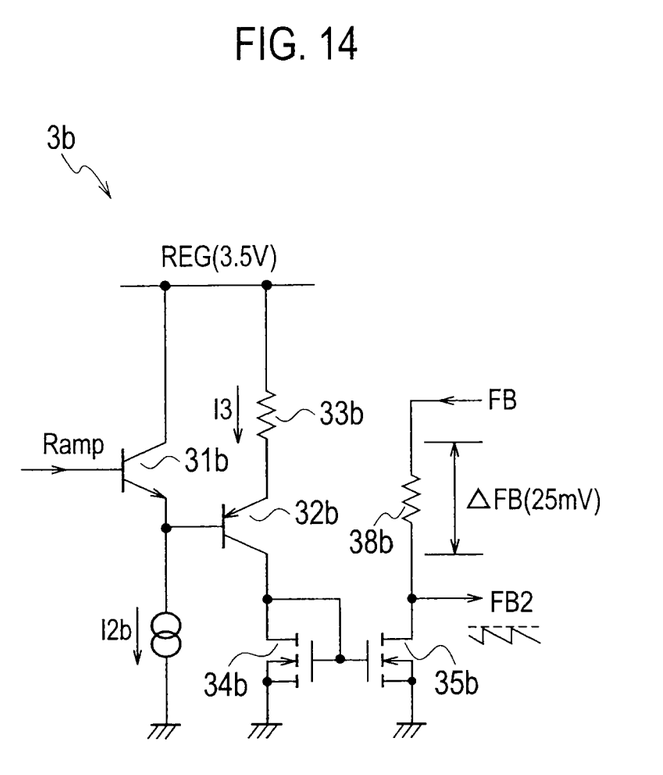
FIG. 14 is a circuit diagram illustrating a superposing circuit arranged in the apparatus of FIG. 13.

FIG. 14 is a circuit diagram illustrating the details of the superposing circuit 3b. In FIG. 13, the superposing circuit 3b includes an npn transistor 31b, a pnp transistor 32b, a resistor 33b, n-channel MOSFETs 34b and 35b, a resistor 38b, and a constant current source I2b.

The npn transistor 31b and pnp transistor 32b form a buffer circuit to conduct impedance conversion on the ramp signal Ramp from the ramp generator 18, so that an emitter of the pnp transistor 32b provides a signal Ramp2 whose voltage level is substantially equal to that of the ramp signal Ramp. As a result, both ends of the resistor 33b provide a potential difference of (REG−Ramp2) to generate a current signal 13 corresponding to a change in the ramp signal Ramp. The current signal 13 is converted by the resistor 38 into a voltage by way of a current mirror circuit of the n-channel MOSFETs 34b and 35b.

At a low-potential terminal of the resistor 38b, the superposing circuit 3b superposes the third ramp signal having a negative inclination proportional to the ramp signal Ramp on the feedback voltage FB, to create the second feedback voltage FB2 (corresponding to the second superposed signal stipulated in the claims) and output the same to an inverting input terminal of a feedback comparator 4.

A first feedback controller 1 in the switching power source apparatus of the present embodiment compares the second superposed signal FB2 from the superposing circuit 3b with a first reference voltage REF, and if the second superposed signal FB2 is lower than the first reference voltage REF, turns on a main switching element, i.e., a high-side MOSFET 11.

The remaining part of Embodiment 2 is the same as that of Embodiment 1, and therefore, a repetition of explanation is omitted.

Operation of Embodiment 2 is substantially the same as that of Embodiment 1 except the operation of the superposing circuit 3b that carries out superposing with respect to the feedback signal FB instead of the first reference voltage REF.

Effect of Embodiment 2, therefore, is similar to the effect of Embodiment 1. Although Embodiment 2 employs the different ramp signal superposing technique, it provides a load regulation improving effect like Embodiment 1. Compared with Embodiment 1 of FIG. 3, Embodiment 2 of FIG. 13 is simpler because the superposing circuit 3b has no current mirror circuit of p-channel MOSFETs.

When packaging the switching power source apparatus into an LSI, it is general to install the feedback resistors Rfb1 and Rbf2 as external parts to make the output voltage Vout variable. In this regard, Embodiment 2 allows ΔFB to be adjustable by selecting the feedback resistors Rfb1 and Rbf2, and therefore, is advantageous in terms of versatility.

The switching power source apparatus according to this aspect of the present invention conducts stable operation and realizes a proper load regulation characteristic even with an output capacitor having a small ESR.

The switching power source apparatuses according to the present invention are applicable to electrical equipment that needs stable power supply.

This application claims benefit of priority under 35USC §119 to Japanese Patent Application No. 2010-133938, filed on Jun. 11, 2010, the entire contents of which are incorporated by reference herein. Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A switching power source apparatus comprising:
a main switching element connected to an input voltage;
a ramp signal generator configured to generate a ramp signal in synchronization with a switching frequency of the main switching element;
an amplitude signal generator configured to generate an amplitude signal corresponding to an amplitude of the ramp signal;
a controller configured to control ON timing of the main switching element according to the ramp signal, a feedback signal corresponding to an output voltage, and a first reference voltage, as well as controlling an ON width of the main switching element according to the amplitude signal, the input voltage, and the output voltage; and
a first superposing circuit configured to generate a second ramp signal having a positive inclination corresponding to the amplitude and frequency of the ramp signal generated by the ramp signal generator and provide a first superposed signal by superposing the second ramp signal on the first reference voltage, wherein
the controller compares the first superposed signal with the feedback signal, and if the feedback signal is lower than the first superposed signal, controls the ON timing of the main switching element so that the main switching element turns on.

2. The switching power source apparatus of claim 1, wherein
the controller controls, according to the amplitude signal generated by the amplitude signal generator, the ON width of the main switching element so that the ramp signal generated by the ramp signal generator maintains a predetermined amplitude value.

3. The switching power source apparatus of claim 2, wherein the amplitude signal generator includes:
a sample and hold circuit configured to hold a valley voltage of the ramp signal generated by the ramp signal generator; and
an error amplifier configured to compare the valley voltage held in the sample and hold circuit with a second reference voltage, generate an error amplified signal according to a result of the comparison, and output the error amplified signal as the amplitude signal.

4. The switching power source apparatus of claim 1, wherein
according to the amplitude signal of the amplitude signal generator, the controller is configured to
widen the ON width if the amplitude of the ramp signal generated by the ramp signal generator is lower than a predetermined value and
narrow the ON width if the amplitude of the ramp signal is equal to or greater than the predetermined value.

5. The switching power source apparatus of claim 1, wherein the amplitude signal generator includes:
a sample and hold circuit configured to hold a valley voltage of the ramp signal generated by the ramp signal generator; and
an error amplifier configured to compare the valley voltage held in the sample and hold circuit with a second reference voltage, generate an error amplified signal according to a result of the comparison, and output the error amplified signal as the amplitude signal.

6. A switching power source apparatus comprising:
a main switching element connected to an input voltage;
a ramp signal generator configured to generate a ramp signal in synchronization with a switching frequency of the main switching element;
an amplitude signal generator configured to generate an amplitude signal corresponding to an amplitude of the ramp signal;
a controller configured to control ON timing of the main switching element according to the ramp signal, a feedback signal corresponding to an output voltage, and a first reference voltage, as well as controlling an ON width of the main switching element according to the amplitude signal, the input voltage, and the output voltage; and
a second superposing circuit configured to generate a third ramp signal having a negative inclination corresponding to the amplitude and frequency of the ramp signal generated by the ramp signal generator and provide a second superposed signal by superposing the third ramp signal on the feedback signal, wherein
the controller compares the second superposed signal with the first reference voltage, and if the second superposed signal is lower than the first reference voltage, controls the ON timing of the main switching element so that the main switching element turns on.

7. The switching power source apparatus of claim 6, wherein
the controller controls, according to the amplitude signal generated by the amplitude signal generator, the ON width of the main switching element so that the ramp signal generated by the ramp signal generator maintains a predetermined amplitude value.

8. The switching power source apparatus of claim 6, wherein
according to the amplitude signal of the amplitude signal generator, the controller is configured to
widen the ON width if the amplitude of the ramp signal generated by the ramp signal generator is lower than a predetermined value and
narrow the ON width if the amplitude of the ramp signal is equal to or greater than the predetermined value.

9. The switching power source apparatus of claim 6, wherein the amplitude signal generator includes:
a sample and hold circuit configured to hold a valley voltage of the ramp signal generated by the ramp signal generator; and
an error amplifier configured to compare the valley voltage held in the sample and hold circuit with a second reference voltage, generate an error amplified signal according to a result of the comparison, and output the error amplified signal as the amplitude signal.

10. A switching power source apparatus comprising:
a main switching element connected to an input voltage;
a ramp signal generator configured to generate a ramp signal in synchronization with a switching frequency of the main switching element;
an amplitude signal generator configured to generate an amplitude signal corresponding to an amplitude of the ramp signal;
a controller configured to control ON timing of the main switching element according to the ramp signal, a feedback signal corresponding to an output voltage, and a first reference voltage, as well as controlling an ON width of the main switching element according to the amplitude signal, the input voltage, and the output voltage wherein
the controller controls, according to the amplitude signal generated by the amplitude signal generator, the ON width of the main switching element so that the ramp signal generated by the ramp signal generator maintains a predetermined amplitude value.

11. The switching power source apparatus of claim 10, wherein
according to the amplitude signal of the amplitude signal generator, the controller is configured to
widen the ON width if the amplitude of the ramp signal generated by the ramp signal generator is lower than a predetermined value and
narrow the ON width if the amplitude of the ramp signal is equal to or greater than the predetermined value.

12. The switching power source apparatus of claim 10, wherein the amplitude signal generator includes:
a sample and hold circuit configured to hold a valley voltage of the ramp signal generated by the ramp signal generator; and
an error amplifier configured to compare the valley voltage held in the sample and hold circuit with a second reference voltage, generate an error amplified signal according to a result of the comparison, and output the error amplified signal as the amplitude signal.

* * * * *